United States Patent [19]

Lessard et al.

[11] Patent Number: 5,261,244
[45] Date of Patent: Nov. 16, 1993

[54] CRYOGENIC WATERPUMP

[75] Inventors: Philip A. Lessard, Boxboro, Mass.;
Douglas F. Aitken, Bedford, N.H.;
Robert D. Bradford, Mansfield,
Mass.; Roland P. Graham, Wakefield,
Mass.; Steven A. Michaud, Hayerhill,
Mass.; Karen J. Manning, East
Bridgewater, Mass.

[73] Assignee: Helix Technology Corporation, Mansfield, Mass.

[21] Appl. No.: 886,721

[22] Filed: May 21, 1992

[51] Int. Cl.⁵ ............................................. B01D 8/00
[52] U.S. Cl. .................................... 62/55.5; 62/268; 55/269; 417/901
[58] Field of Search .................... 62/55.5, 268; 55/269; 417/901

[56] References Cited

U.S. PATENT DOCUMENTS

| | | | |
|---|---|---|---|
| 3,579,997 | 5/1971 | Rapinat | 62/55.5 |
| 4,277,951 | 7/1981 | Longsworth | 62/55.5 |
| 4,541,249 | 9/1985 | Graves et al. | 62/55.5 |
| 4,555,912 | 12/1985 | Bogosh | 62/55.5 X |
| 4,679,402 | 7/1987 | Andeen | 62/55.5 |
| 4,724,677 | 2/1988 | Foste4r | 62/55.5 |
| 4,815,303 | 3/1989 | Duza | 62/55.5 |
| 4,838,035 | 6/1989 | Carlson et al. | 62/55.5 |
| 4,873,833 | 10/1989 | Pfeiffer et al. | 62/55.5 |
| 4,926,648 | 5/1990 | Okumura et al. | 62/55.5 |
| 4,979,369 | 12/1990 | Larin et al. | 62/55.5 |
| 5,056,319 | 10/1991 | Strasser | 62/55.5 |
| 5,062,271 | 11/1991 | Okumura et al. | 62/55.5 |

FOREIGN PATENT DOCUMENTS

| | | | |
|---|---|---|---|
| 0008480 | 1/1985 | Japan | 62/55.5 |
| 0088881 | 5/1985 | Japan | 62/55.5 |
| 0003177 | 1/1987 | Japan | 62/55.5 |
| 0937765 | 6/1982 | U.S.S.R. | 417/901 |

OTHER PUBLICATIONS

Kenji Yokokura et al., JAERI Memo 8926, "Improvements in the JFT-2 Vacuum System," Japan Atomic Energy Research Institute, Jul. 1980, pp. 1–129.

Kenji Yokokura et al., "Bakeable Cryopump for JFT2," Japan Atomic Energy Research Institute, 20th Joint Symposium on Vacuum Commemorating the 25th Anniversary of the Vacuum Society of Japan, 26–276, 1979.

Pamphlet, AP-8S Cryopump-Setting New Standards for Operational Reliability, Air Products and Chemicals, Inc., 1983, 4 pp.

"Cryo-T8 Cryo-T12", 1 page pamphlet, ULVAC Cryogenics.

Primary Examiner—Henry A. Bennet
Assistant Examiner—Christopher B. Kilner
Attorney, Agent, or Firm—Hamilton, Brook, Smith & Reynolds

[57] ABSTRACT

A cold trap includes a set of baffles cooled by the cold finger of a closed cycle refrigerator. The baffles are vertically disposed in a vertical fluid conduit with frustoconical and conical surfaces for directing liquid to a circular trough during regeneration. After the liquid is collected, it is blown from the trough through a pressure relief valve by a nitrogen purge. The trough is formed in the upper surface of a connecting flange at the lower end of the fluid conduit.

23 Claims, 4 Drawing Sheets

CRYOGENIC WATERPUMP

BACKGROUND OF THE INVENTION

In many applications, cryogenically cooled baffles are positioned within a fluid conduit to trap gases, particularly water vapor, and thus remove the gases from the flowing fluid. For example, although diffusion pumps are very efficient at removing many gases from the environment to create a vacuum, they are not efficient in pumping water vapor. Therefore, it is common practice to position a cold trap in-line ahead of the diffusion pump to remove the water vapor as the remainder of the gases in the fluid are drawn by the diffusion pump. Similarly, cold traps are used in-line ahead of other vacuum pumps such as turbomolecular pumps.

SUMMARY OF THE INVENTION

Since cryogenically cooled cold traps are capture devices, they must periodically be regenerated to clear the water which collects as frost on the baffles. To that end, refrigeration is discontinued, and the baffles are allowed to warm or are heated in order to release the trapped water. One mechanism of release is that of sublimation with removal of the released water vapor by a roughing pump. However, sublimation is a slow process which is difficult to control. More likely, the water melts to a liquid which is then difficult to remove from the system.

In accordance with the present invention, a cold trap comprises a fluid conduit for coupling into a fluid flow path. Means such as a closed-cycle cryogenic cooler is provided for cooling a set of baffles within the flow path to cryogenic temperatures. The set of baffles are suspended within the fluid conduit to impose a serpentine flow path to fluid flowing flowing through the fluid conduit. The baffles are sloped to direct liquid, during the regeneration process, from the baffles to a trough on the fluid conduit. A drain port drains liquid from the trough out of the fluid conduit.

To serve as a waterpump, the baffle should be held to temperatures within the range of 90 to 130 K and preferably to about 110 K.

Preferably, the baffles are cooled by the cold finger of a cryogenic refrigerator which extends through a side wall of the fluid conduit. The set of baffles are vertically disposed within the conduit and are mounted to the cold finger. An upper frustoconical baffle slopes downward toward the center of the fluid conduit. A conical baffle is positioned below the upper frustoconical baffle and slopes downward away from the center of the fluid conduit. The conical baffle receives liquid drained from the upper frustoconical baffle and directs the liquid outward. A lower frustoconical baffle below the conical baffle slopes downward away from the center of the fluid conduit. That baffle receives liquid drained from the conical baffle and directs the liquid outward. Preferably, the trough is formed in the upper surface of a lower connecting flange on the fluid conduit.

In accordance with a method of the present invention, the baffles are warmed to melt the captured water vapor, and the resultant liquid is drained from the baffles to the trough. The drain port couples the trough to a pressure relief valve. After liquid is collected in the trough, a purge gas is applied to the fluid flow path in order to blow the liquid through the pressure relief valve.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
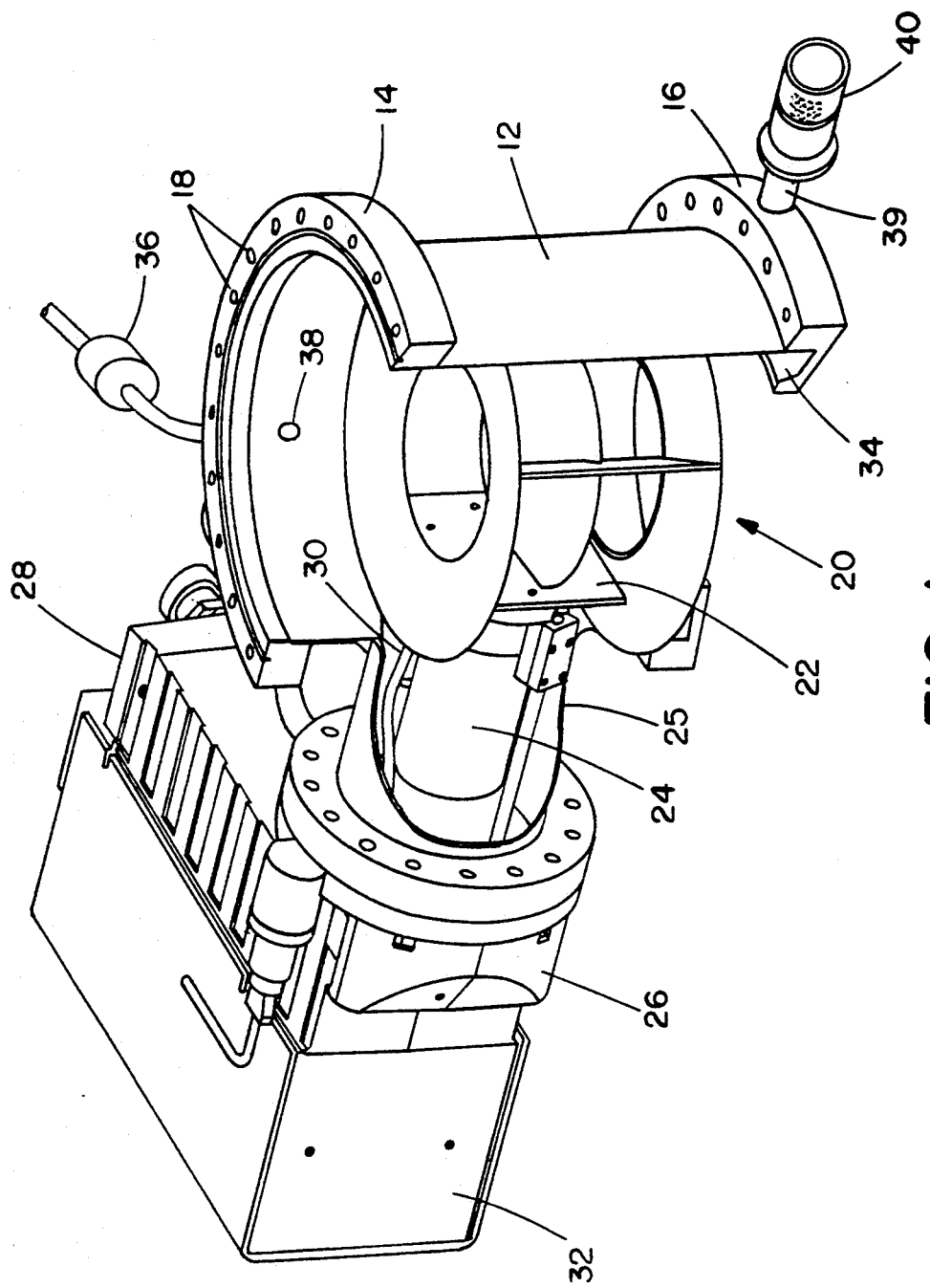
FIG. 1 is a perspective view of a cold trap embodying the present invention broken away to expose the refrigerator cold finger and cooled baffles.
Figure 2:
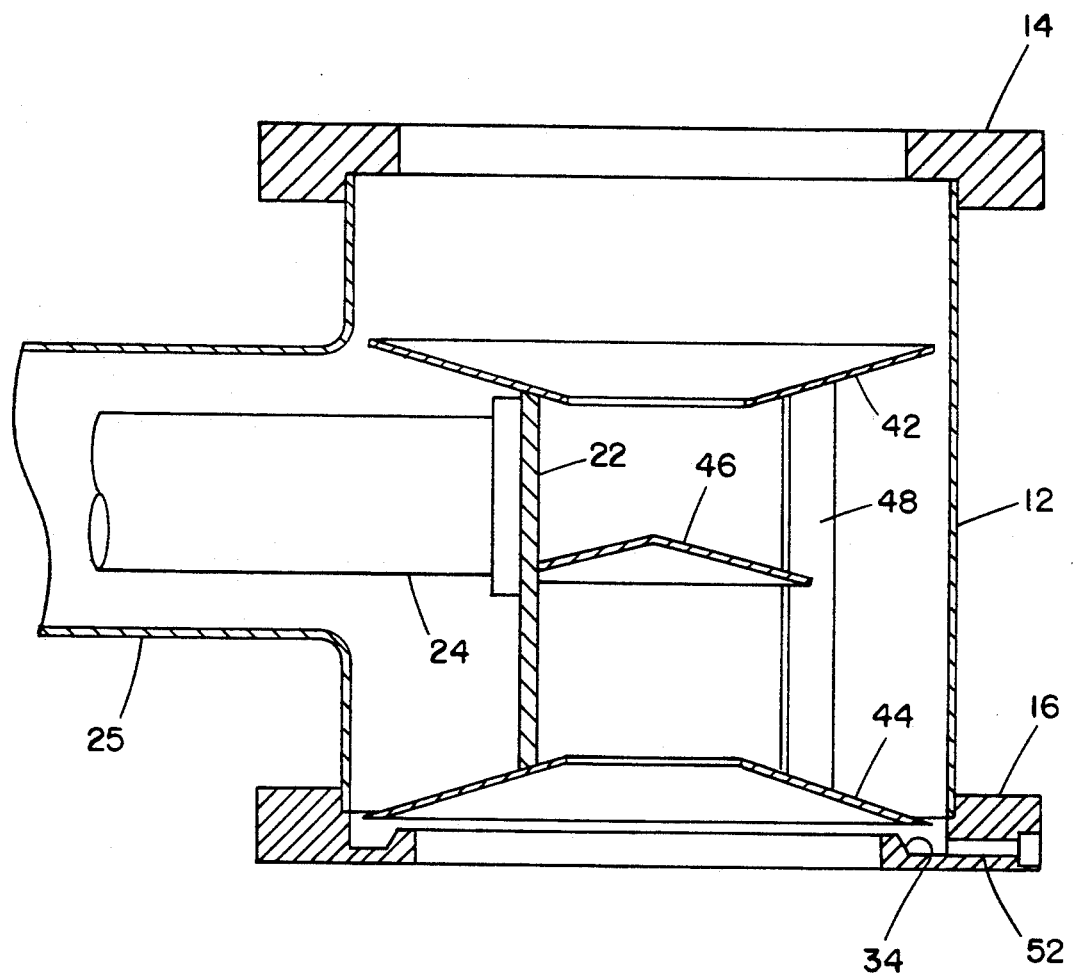
FIG. 2 is a cross-sectional view of the baffles within the fluid conduit.

As illustrated in FIGS. 1 and 2, a waterpump of the present invention includes a cylindrical fluid conduit 12 having connecting flanges 14 and 16 at opposite ends thereof. For example, the flange 14 might couple the waterpump to a port in a process chamber and the flange 16 might couple the cold trap to a diffusion pump which serves as the principal vacuum pump to the process chamber. Each flange has bolt holes 18 for mounting.

Suspended across the fluid conduit 12 is a set of baffles 20 which are mounted to a heat station 22 at the end of a single stage cryogenic refrigerator 24. The baffles 20 are suspended to avoid contact with the conduit 12 and thus avoid a thermal short from the refrigerator to the conduit which is at ambient temperature. The cold finger is centered within a side vessel 25 which is at ambient temperature.

The cryogenic refrigerator is a conventional Gifford-MacMahon refrigerator. Within the cold finger 24 is a displacer which is driven through a scotch-yoke assembly 26 by a motor 28. Preferably, the refrigerator is provided with a temperature sensor for sensing the temperature of the heat sink 22 and a heater 30 for controlling the temperature of the heat sink. Temperatures of the heat sink during operation to a preferred temperature of 110 K and during the regeneration process are controlled by electronics within a housing 32 as described in U.S. Pat. No. 4,918,930.

The baffles 20, which will be discussed in detail below, are arranged to present a serpentine path to any gas flowing through the fluid conduit 12. With that water vapor is likely to contact one of the baffles and be captured, yet the baffles do not provide substantial flow resistance to other gases. After a period of time, the frost of the captured water collects to such an extent that the waterpump must be regenerated. The regeneration process may be initiated by a user or may be under a programmed timing sequence initiated by the electronics 32. In either case, the operation of the refrigerator is discontinued to permit the baffles to warm. Preferably, for rapid regeneration the baffles are heated through the heat station 22 by the heater 30. The baffles are formed to direct all resultant liquid water to a collection trough 34 at the lower end of the fluid conduit. For ease of manufacturing, the trough may be formed in the upper surface of the flange 16 as illustrated. The trough 34 is coupled through a drain pipe 39 to a pressure relief valve 40. A preferred pressure relief valve 40 is presented in U.S. application Ser. No. 07/800,759 filed Dec. 2, 1992 by Clarke et al. and assigned to the assignee of the present invention.

Once the baffles have been heated to 310 K, and preferably after a wait of about three minutes to assure that all frost has melted, a nitrogen purge gas is introduced through a valve 36 and port 38 into the fluid conduit 12. Once the pressure within the fluid conduit 12 reaches a level of about 1 PSI gauge, the relief valve 40 opens and the liquid in the trough 34 is blown through the drain port 39. Preferably, the purge is maintained for about five minutes as the baffles are heated by the heater 30. Then, the baffles and troughs should be sufficiently dry. The heater is turned off and the refrigerator is again turned on to cool the baffles for continued operation.

Figure 3:
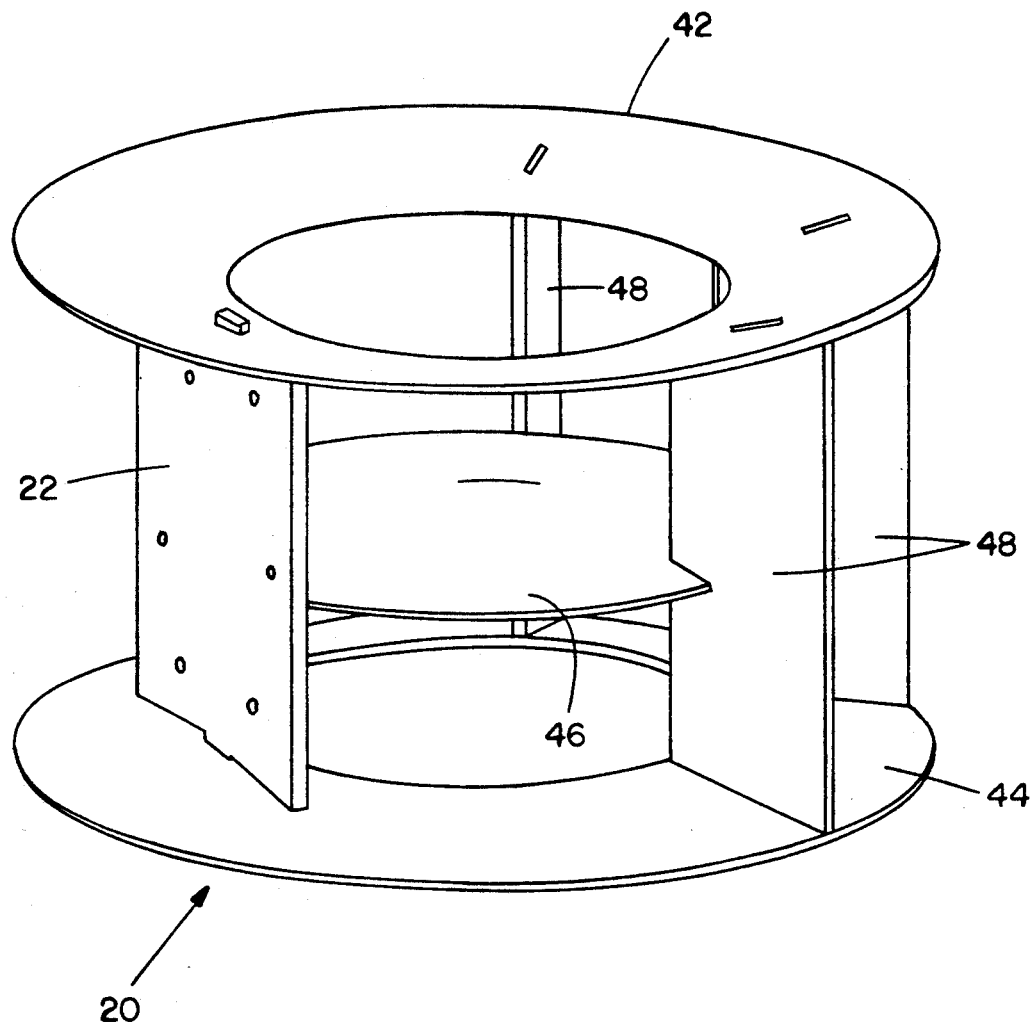
FIG. 3 is a perspective view of the baffles of the cold trap.

FIGS. 2 and 3 show details of the baffles 20. They include upper and lower frustoconical baffles 42 and 44 and a central conical baffle 46, all joined together by radial struts 48 and by the heat station 22. The entire assembly is mounted to the cold finger through the heat station 22. For proper draining, all baffles are angled at greater than 10° from the horizontal, and preferably at least 15°. The upper frustoconical baffle 42 is inclined downward toward the center of the fluid conduit to direct water down to the central conical baffle 46. Thus, the baffle 46 has an outer diameter which is greater than the diameter of the central apertures of the baffles 42 and 44. The conical baffle 46 directs liquid outward such that it drains down onto the lower baffle 44. The baffle 44 is sloped to continue to direct any liquid outward to the trough 34. With this configuration, all liquid is rapidly drained toward the common trough so that the liquid does not drain into the diffusion or other pump from which it would be difficult to remove.

It is significant that the water from the upper baffle 42 is directed inward to the central baffle 46 rather than outward to the wall of the conduit 12. Although water on the wall of the conduit would drain to the trough 34, it would wet that surface. Subsequently, when the baffles are cooled and the vacuum formed, the water would evaporate from the ambient temperature conduit wall, thus slowing creation of a very low pressure vacuum. On the other hand, any water remaining on one of the baffles would immediately be frozen and would thus not interfere with creation of the vacuum.

Figure 4:
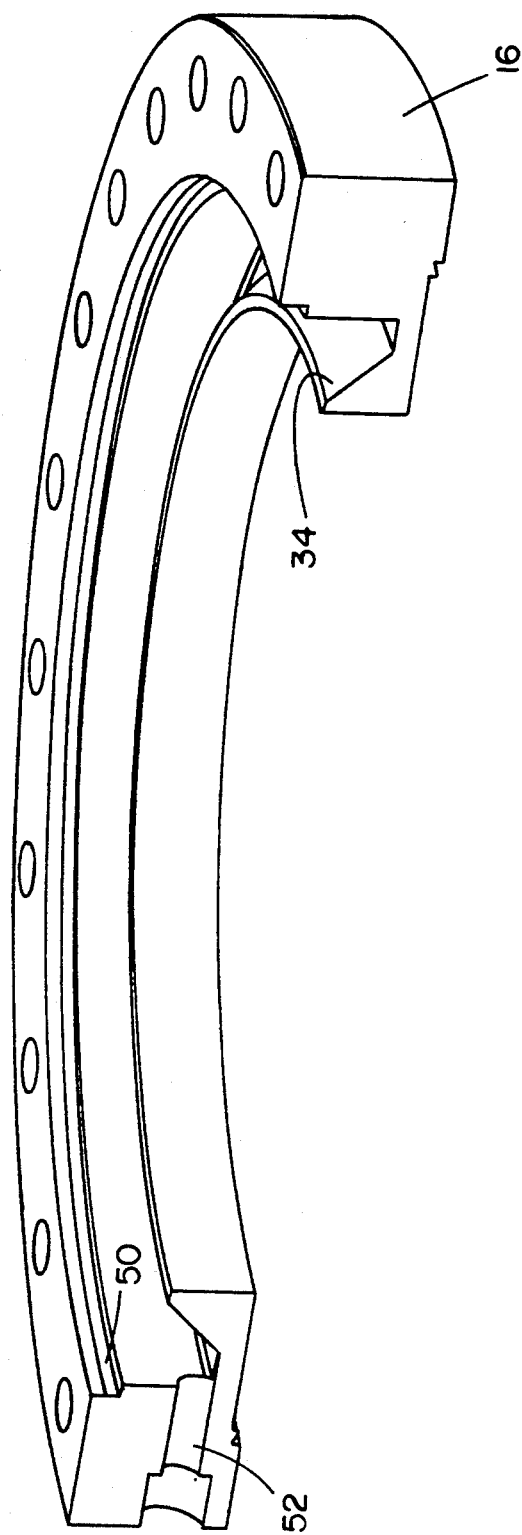
FIG. 4 is a sectioned perspective view of the flange of the fluid conduit with the liquid trough formed therein.

As illustrated in FIG. 4, the trough is readily provided by machining it into the flange 16 to which the fluid conduit 12 is welded along the step 50. The drain port 52 is drilled through the flange to couple the trough to the drain pipe 39 and relief valve 40.

While this invention has been particularly shown and described with references to preferred embodiments thereof, it will be understood by those skilled in the art that various changes in form and details may be made therein without departing from the spirit and scope of the invention as defined by the appended claims. For example, the principal application of the invention is as a waterpump, but with proper temperature selection the cold trap may be used to trap other vapors. Also, a closed cycle Gifford-MacMahon helium refrigerator is the preferred cryogenic source, but other refrigeration sources may also be used.

We claim:

1. A cold trap comprising:
    a fluid conduit having connecting flanges at opposite ends thereof for coupling into a fluid flow path;
    a trough formed in an upper surface of a lower flange;
    a set of baffles within the fluid conduit to be cooled to cryogenic temperature, the set of baffles comprising a plurality of baffles suspended within the fluid conduit to impose a serpentine flow path to fluid flowing through the fluid conduit, the baffles being shaped to drain liquid from the baffles to the trough in the fluid conduit;
    a drain port for draining liquid from the trough out of the fluid conduit; and
    a pressure relief valve coupled to the outlet of the drain port.

2. A cold trap as claimed in claim 1 further comprising a source of purge gas for introducing purge gas into the fluid conduit.

3. A cold trap as claimed in claim 1 wherein the baffles are vertically disposed frustoconical and conical baffles.

4. A cold trap as claimed in claim 1 for capturing water vapor, wherein the baffles are maintained at a temperature within the range of 90 to 130 K.

5. A cold trap comprising:
    a fluid conduit for coupling into a vertical fluid flow path;
    a cold finger of a cryogenic refrigerator extending through a side wall of the fluid conduit;
    a set of baffles mounted to the cold finger to be cryogenically cooled and suspended across the fluid flow path within the fluid conduit, the set of baffles comprising:
        an upper frustoconical baffle sloping downward toward the center of the fluid conduit;
        a conical baffle below the upper frustoconical baffle sloping downward away from the center of the fluid conduit for receiving liquid drained from the upper frustoconical baffle and directing the liquid outward; and
        a lower frustoconical baffle below the conical baffle sloping downward away from the center of the fluid conduit for receiving liquid drain and from the conical baffle and directing the liquid outward;
    a circular trough for receiving liquid drained from the lower frustoconical baffle; and
    a drain port for draining liquid from the trough out of the fluid conduit.

6. A cold trap as claimed in claim 5 wherein the fluid conduit has connecting flanges at opposite ends thereof and the trough is formed in an upper surface of a lower flange.

7. A cold trap as claimed in claim 6 further comprising a pressure relief valve coupled to the outlet of the drain port.

8. A cold trap as claimed in claim 7 further comprising a source of purge gas for introducing purge gas into the fluid conduit.

9. A cold trap as claimed in claim 8 wherein the baffles are joined by vertical plates.

10. A cold trap as claimed in claim 5 further comprising a pressure relief valve coupled to the outlet of the drain port.

11. A cold trap as claimed in claim 10 further comprising a source of purge gas for introducing purge gas into the fluid conduit.

12. A cold trap as claimed in claim 5 for capturing water vapor, wherein the baffles are maintained at a temperature within the range of 90 to 130 K.

13. A method of trapping water in a fluid flow path comprising:
  suspending a set of baffles in a fluid flow path;
  cooling the baffles to cryogenic temperature to capture water vapor from the fluid flow path;
  warming the baffles to melt the captured water vapor and draining liquid water from the baffles to a trough coupled through a drain port to a pressure relief valve; and
  applying a purge gas to the fluid flow path to blow the liquid through the pressure relief valve.

14. A method as claimed in claim 13 wherein the set of baffles comprise:
  an upper frustoconical baffle sloping downward toward the center of the fluid conduit;
  a conical baffle below the upper frustoconical baffle sloping downward away from the center of the fluid conduit for receiving liquid drained from the upper frustoconical baffle and directing the liquid outward; and
  a lower frustoconical baffle below the conical baffle sloping downward away from the center of the fluid conduit for receiving liquid drained from the conical baffle and directing the liquid outwards.

15. A method as claimed in claim 14 wherein the fluid conduit has connecting flanges at opposite ends thereof and the trough is formed in an upper surface of a lower flange.

16. A method as claimed in claim 13 wherein the fluid conduit has connecting flanges at opposite ends thereof and the trough is formed in an upper surface of a lower flange.

17. A method as claimed in claim 13 wherein the baffles are cooled by a refrigerator cold finger to a controlled temperature in the range of 90 to 130 K.

18. A cold trap comprising:
  a fluid conduit having connecting flanges at opposite ends thereof for coupling into a fluid flow path;
  a trough formed in an upper surface of a lower flange;
  a cryopumping surface within the fluid conduit to be cooled to cryogenic temperature, the cryopumping surface being shaped to drain liquid therefrom to the trough in the fluid conduit;
  a drain port for draining liquid from the trough out of the fluid conduit; and
  a pressure relief valve coupled to the outlet of the drain port.

19. A cold trap as claimed in claim 18 further comprising a source of purge gas for introducing purge gas into the fluid conduit.

20. A cold trap as claimed in claim 18 wherein the cryopumping surface is maintained at a temperature within the range of 90 to 130 K.

21. A method of trapping water in a fluid flow path comprising:
  suspending a cryopumping surface in a fluid flow path;
  cooling the cryopumping surface to cryogenic temperature to capture water vapor from the fluid flow path;
  warming the cryopumping surface to melt the captured water vapor and draining liquid water from the cryopumping surface to a trough coupled through a drain port to a pressure relief valve; and
  applying a purge gas to the fluid flow path to blow the liquid to the pressure relief valve.

22. A method as claimed in claim 21 wherein the fluid conduit has connecting flanges at opposite ends thereof and the trough is formed in an upper surface of a lower flange.

23. A method as claimed in claim 21 wherein the cryopumping surface is cooled by refrigerator cold finger to a controlled temperature in the range of 90 to 130 K.

* * * * *